Oct. 27, 1964　　　A. W. VANCE　　　3,154,679
MULTIPLYING DEVICES
Filed Aug. 20, 1949
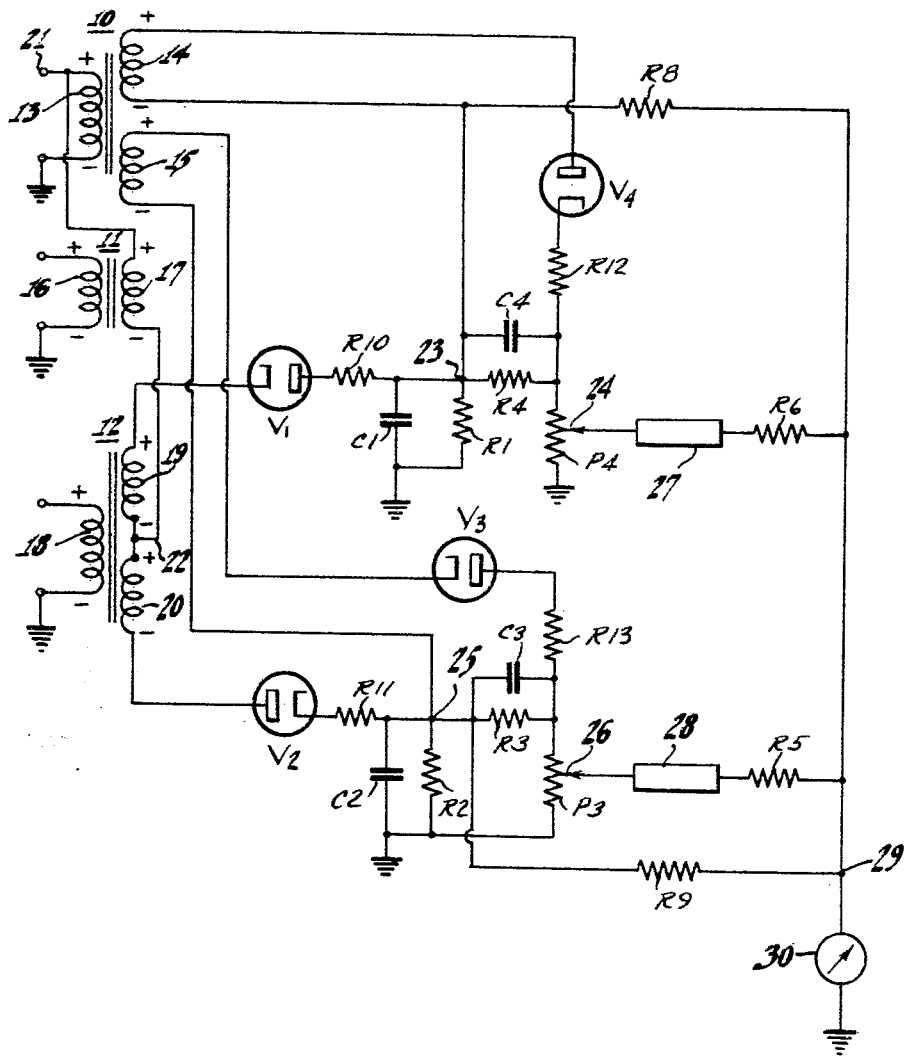
INVENTOR
ARTHUR W. VANCE
BY
ATTORNEY

United States Patent Office 3,154,679
Patented Oct. 27, 1964

3,154,679
MULTIPLYING DEVICES
Arthur W. Vance, Union Valley, N.J., assignor to Radio Corporation of America, a corporation of Delaware
Filed Aug. 20, 1949, Ser. No. 111,518
3 Claims. (Cl. 235—194)

This invention relates to multiplying devices and has for its principal object the provision of an improved multiplier of the square law type or a multiplier using a square function of the terms being multiplied, wherein the major portion of the square function is obtained by the use of the fundamental properties of the vector and scalar addition of alternating voltages.

The scalar value of the sum of a variable voltage E and a unit quadrature voltage is $\sqrt{E^2+1}$. By substracting 1, the function passes through zero and becomes $\sqrt{E^2+1}-1$. If this expression is multiplied by 2, it becomes $$2\sqrt{E^2+1}-2$$

To find the difference between this last expression and the true square of E or $E^2$, they are subtracted giving $$E^2-(2\sqrt{E^2+1}-2)$$
$$=E^2-2\sqrt{E^2+1}+2$$
$$=E^2+1-2\sqrt{E^2+1}+1$$
$$=(\sqrt{E^2+1}-1)^2$$

This latter term is the difference or correction term required to make $2\sqrt{E^2+1}-2$ equal a true square. $E^2$ may therefore be expressed as follows:

$$E^2=2\sqrt{E^2+1}-2+(\sqrt{E^2+1}-1)^2$$

By expanding and collecting terms, this expression may be shown to be an identity and is therefore correct.

If E is limited to a maximum value of 1, then the maximum of this difference or correction term is .171572 of the maximum square. Thus it is possible to obtain the correction term with sufficient accuracy by means of a simple Thyrite circuit.

The voltage E is considered hereinafter to have a value dependent on the sum or the difference of two variables $x$ and $y$, and it is the function of the multiplying device of the present invention to derive the product of these two variables either in the form of a unidirectional current or in the form of a unidirectional voltage depending on the type of indicator used.

The multiplying device itself includes a number of transformers, diodes, resistors and capacitors so interconnected with one another and with a pair of Thyrite elements as to produce and properly combine the voltages which are representative of the various factors involved in computing the product of the variables $x$ and $y$.

Three transformers are utilized. To the primary of the first transformer is applied a standard voltage which is assumed to be 200 volts. To the primary windings of the other two transformers are applied voltages which are representative of the values of $x$ and $y$ respectively. All the transformers have a transformation ratio of unity and all the primary voltages have the same frequency.

The primary of the first transformer is excited with a fixed A.C. voltage that is in quadrature with the primary voltages of the other two transformers and these voltages are combined, as hereinafter explained, to provide voltages representative of $$\sqrt{(x+y)^2+(200)^2} \text{ and of } \sqrt{(x-y)^2+(200)^2}$$

These last mentioned two voltages are rectified and the D.C. output of each diminished by a standard D.C. voltage obtained by rectifying the secondary output of the first transformer of 200 volts to produce voltages of $$\sqrt{(x-y)^2+(200)^2}-200 \text{ and } \sqrt{(x+y)^2+(200)^2}-200$$

each of which is converted by a different Thyrite element to a correction factor $$(\sqrt{(x+y)^2+(200)^2}-200)^2 \text{ or }$$
$$(\sqrt{(x-y)^2+(200)^2}-200)^2$$

These correction factors and the voltages from which they are derived are so combined as to produce a unidirectional current or voltage of a value which is representative of the product $xy$.

The invention will be better understood from the following description considered in connection with the accompanying drawing and its scope is indicated by the appended claims.

The single figure of the drawing is a wiring diagram of the improved multiplying device.

This device is illustrated as including three input transformers 10, 11 and 12. The transformer 10 has a primary winding 13 and two secondary windings 14 and 15. The transformer 11 has a primary winding 16 and a secondary winding 17. The transformer 12 has a primary winding 18 and two secondary windings 19 and 20. The secondary winding 17 has one of its terminals connected to a terminal 21 of the primary winding 13 and its other terminal connected to the common terminal 22 of the secondary windings 19 and 20.

The transformers 10, 11 and 12 have a transformation ratio of unity, have substantially identical electrical characteristics at the operating frequency of the multiplying device, and the primary voltage of the transformer 10 is excited at quadrature with the primary voltages of the transformers 11 and 12. The primary voltages of all the transformers have the same frequency.

The voltage applied to the primary winding 13 is fixed at some standard value such as 200 volts R.M.S. The voltage applied to the primary winding 16 has a value dependent on the value of one of the factors $x$ and is not permitted to exceed a R.M.S. value of 200 volts. The voltage applied to the primary winding 18 is representative of the value of the other factor and is not allowed to exceed a maximum of 200 volts R.M.S.

Under these conditions, there is available (1) at the output terminals of each of the secondary windings 14 and 15 a voltage which is fixed at a value of 200 volts, (2) at the terminals of the winding 19 a voltage equal to $\sqrt{(x-y)^2+(200)^2}$ and (3) at the terminals of the winding 20 a voltage equal to $\sqrt{(x+y)^2+(200)^2}$.

The fixed voltage of the secondary winding 14 is applied through a diode $V_4$ and a cathode lead resistor $R_{12}$ to a resistor $R_4$. The resistor $R_4$ is shunted by a capacitor $C_4$ and has its left hand terminal connected at a point 23 to the upper terminal of a resistor $R_1$, which is shunted by a condenser $C_1$.

The voltage ($\sqrt{(x-y)^2+(200)^2}$) available at the secondary winding 19 is applied through a diode $V_1$ and an anode lead resistor $R_{10}$ to the resistor $R_1$ and shunt capacitor $C_1$. As a result there is made available between ground and the right hand end of the resistor $R_4$ a voltage equal to $\sqrt{(x-y)^2+(200)^2}-200$. This voltage is applied to a potentiometer $P_4$ which includes a movable contact member 24.

The contact member 24 is connected through a Thyrite element 27 and a resistor $R_6$ to an output terminal 29. The point 23 is also connected to the terminal 29 through a resistor $R_8$. Thus there is applied (1) from the point 23 to the terminal 29 a voltage equal to $\sqrt{(x-y)^2+(200)^2}$ and (2) from the contact member 24 to the point 29 a voltage which is dependent on $\sqrt{(x-y)^2+(200)^2}-200$ and has a value determined by the electrical characteristics of the Thyrite element 27.

The characteristics of Thyrite are described in General Electric Review for April 1934, pages 175–179, and May 1934, pages 218–233. The characteristics of different pieces of Thyrite vary considerably with shape, size, molecular composition and applied voltage. In general, a particular Thyrite element has a characteristic represented by the formula $I=KE^v$, where $K$ and $v$ represent characteristics peculiar to the individual Thyrite element and $E$ is the voltage applied to the element. By suitable selection of the characteristics of the Thyrite element 27, it may be made to yield at the point 29 a current equal to the correction factor $$K(\sqrt{(x-y)^2+(200)^2}-200)^2$$

when a voltage proportional to $\sqrt{(x-y)^2+200^2}-200$ is applied thereto.

The fixed voltage of the secondary winding 15 is applied through a diode $V_3$ and an anode lead resistor $R_{13}$ to a resistor $R_3$ which is shunted by a capacitor $C_3$. The output voltage of the secondary winding 20, which has a value of $\sqrt{(x-y)^2+(200)^2}$, is applied through a diode $V_2$ and a cathode lead resistor $R_{11}$ to a resistor $R_2$ which is shunted by a capacitor $C_2$ and has its upper terminal 25 in common with the left hand terminal of the resistor $R_3$. With these conections there is available between ground and the right hand terminal of the resistor $R_3$ a voltage equal to $\sqrt{(x+y)^2+(200)^2}-200$.

This voltage is applied to a potentiometer $P_3$ which has its movable contact member 26 connected through a Thyrite element 28 and a resistor $R_5$ to the terminal 29. The Thyrite element 28 has its characteristics so selected as to provide at the terminal 29 a current equal to the correction factor $(\sqrt{(x+y)^2+(200)^2}-200)^2$. Also applied to the terminal 29 through a resistor $R_9$ is the voltage $\sqrt{(x+y)^2+(200)^2}$ derived from the resistor $R_2$.

The current flowing to point 29 through resistor $R_8$ and $R_6$ is $$B=\sqrt{(x-y)^2+(200)^2}+K(\sqrt{(x-y)^2+(200)^2}-200)^2$$

This is opposed by the current A flowing to point 29 through resistors $R_5$ and $R_9$. This opposing current is $$A=\sqrt{(x+y)^2+(200)^2}+K(\sqrt{(x+y)^2+(200)^2}-200)^2$$

$$=\sqrt{(x+y)^2+(200)^2}+K[(x+y)^2+(200)^2-2(200)(\sqrt{(x+y)^2+(200)^2})+(200)^2]$$

$$=[1-400K][\sqrt{(x+y)^2+(200)^2}]+K[(x-y)^2+2(200)^2]$$

It can similarly be shown that $$B=[1-400K][\sqrt{(x-y)^2+(200)^2}]+K[(x-y)^2+2(200)^2]$$

If we select a Thyrite so that K is equal to $\frac{1}{400}$, it can be readily shown that $$A-B=\frac{1}{100}xy.$$

A meter 30 is used to read this current which is proportional to the product $xy$. Alternatively, the ammeter 30 may be replaced by a summing amplifier such as that disclosed by a copending application of Goldberg and Lehmann, Serial No. 90,072, filed April 28, 1949, and assigned to a common assignee, now Patent Number 2,684,999, in which case the product is in the form of a unidirectional voltage.

As previously indicated, all the transformers should have identical electrical characteristics at the operating frequency of the multiplying device. All the diodes may be of the RCA 83V type. The various circuit constants and applied voltages may be as follows:

$R_1=R_2=R_3=R_4=10{,}000$ ohms
$R_{11}=R_{12}=R_{13}=R_{10}=2200$ ohms
$R_9=R_{10}=1$ meg.
$P_4=P_3=100{,}000$ ohms
Max. of $x$=max. of $y$=fixed value of A.C. std.=200 volts R.M.S.

$$C_1=C_2=C_3=C_4=\frac{10-3}{f}\text{ farads where } f \text{ is the operating frequency}$$

In adjusting the potentiometers $P_3$ and $P_4$ to produce the proper correction factors, the following procedure will be found to be satisfactory.

Set $x=y=200$ volts with $x$ in phase with $y$.

Set $P_4$ to zero, and $P_3$ to zero and read output meter 30. Then adjust $P_3$ until output meter reading increases to 1.615 times the previous reading.

Then reverse the phase of $x$ or $y$ and adjust $P_4$ until output meter reads the same value as before the phase reversal. The meter reading will, of course, be negative and if a zero center meter is not used the meter will need to be reversed. These adjustments are necessary to set the proper ratio between the correction term and the main term since Thyrite varies somewhat in resistance between different pieces. The other ratios should not require adjustments if the other components have the precise values indicated and the characteristics of the rectifiers are reasonably matched. The overall scale factor of the multiplying device is such that $xy$ when each is a max. of 200 volts R.M.S. on input is about 200 microamperes.

What the invention provides is an improved square law type multiplying device wherein the major portion of the square function is obtained by the use of the fundamental properties of the vector and scaler addition of alternating voltages and the required correction factors of the square function are derived from such voltages through the medium of simple Thyrite circuits.

What is claimed is:

1. In a device for producing an electrical effect representative of the product of two variables $x$ and $y$, the combination of a plurality of transformers interconnected to provide resultant alternating voltages the first of which is propotrional to the vector sum of $(x+y)$ and a quadrature voltage of standard value and the second of which is prorportional to the vector sum of $(x-y)$ and said quadrature voltage, means for rectifying said first and second alternating voltages to produce first and second unidirectional voltages, means for producing third and fourth unidirectional voltages each proportional to said standard value voltage, means for producing difference voltages the first of which is the difference between said first and third unidirectional voltages and the second of which is the difference between said second and fourth unidirectional voltages, means responsive to said difference voltages for producing correction voltages each proportional to the square of a different one of said difference voltages, an output terminal, means for applying each of said first and second unidirectional voltages as currents to said output terminal, and means for applying each of said correction voltages as currents to said output terminal to provide a net resultant at said output terminal representative of the product of $x$ and $y$.

2. In a device for producing an electrical effect representative of the product of two variables $x$ and $y$, the combination of a plurality of transformers interconnected to provide resultant alternating voltages the first of which is proportional to the vector sum of $(x+y)$ and a quadrature voltage of standard value and the second of which is proportional to the vector sum of $(x-y)$ and said quadrature voltage, means for rectifying said first and second alternating voltages to produce first and second unidirectional voltages, means for producing third and fourth unidirectional voltages each proportional to said standard value voltage, means for producing difference voltages the first of which is the difference between said first and third unidirectional voltages and the second of which is the difference between said second and fourth unidirectional voltages, means responsive to said difference voltages for producing correction voltages each proportional to the square of a different one of said difference voltages, an output terminal, means for applying each of said first and second unidirectional voltages as currents to said output terminal, means for applying said correction voltages as currents to said output terminal, and means for indicating the resultant electrical effect produced at said output terminal by all said currents.

3. In a device for producing an electrical effect representative of the product of two variables $x$ and $y$, the combination of a plurality of transformers interconnected to provide resultant alternating voltages the first of which is proportional to the vector sum of $(x+y)$ and a quadrature voltage of standard value and the second of which is proportional to the vector sum of $(x-y)$ and said quadrature voltage, means for rectifying said first and second alternating voltages to produce first and second unidirectional voltages, means for producing third and fourth unidirectional voltages each proportional to said standard value voltage, means for producing difference voltages the first of which is the difference between said first and third unidirectional voltages and the second of which is the difference between said second and fourth unidirectional voltages, means including Thyrite elements responsive to said difference voltages for producing correction voltages each proportional to the square of a different one of said difference voltages, an output terminal, means for applying each of said first and second unidirectional voltages as currents to said output terminal, and means for applying each of said correction voltages as currents to said output terminal to provide a combined resultant representative of the product of $x$ and $y$.

References Cited in the file of this patent

UNITED STATES PATENTS

| | | |
|---|---|---|
| 2,401,404 | Bedfore | June 4, 1946 |
| 2,401,447 | Wipff | June 4, 1946 |
| 2,433,236 | Rajchman | Dec. 23, 1947 |
| 2,433,237 | Rajchman | Dec. 27, 1947 |

UNITED STATES PATENT OFFICE
CERTIFICATE OF CORRECTION

Patent No. 3,154,679                                October 27, 1964

Arthur W. Vance

It is hereby certified that error appears in the above numbered patent requiring correction and that the said Letters Patent should read as corrected below.

Column 3, lines 26 and 55, for "(x-y)", each occurrence, read -- (x+y) --.

Signed and sealed this 20th day of April 1965.

(SEAL)
Attest:

ERNEST W. SWIDER                                EDWARD J. BRENNER
Attesting Officer                                     Commissioner of Patents